United States Patent
Liu et al.

(10) Patent No.: US 10,129,607 B2
(45) Date of Patent: Nov. 13, 2018

(54) USING ANALYTICAL MODELS TO INFORM POLICY DECISIONS

(71) Applicant: GENERAL INSTRUMENT CORPORATION, Horsham, PA (US)

(72) Inventors: Yan Liu, Hanover Park, IL (US); Paul C. Davis, Arlington Heights, IL (US); Zhi Fu, Herndon, VA (US); Kabe Vanderbaan, Arlington Heights, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 1126 days.

(21) Appl. No.: 13/719,414

(22) Filed: Dec. 19, 2012

(65) Prior Publication Data
US 2014/0173075 A1 Jun. 19, 2014

(51) Int. Cl.
*G06F 15/16* (2006.01)
*H04N 21/8355* (2011.01)
(Continued)

(52) U.S. Cl.
CPC ......... *H04N 21/8355* (2013.01); *G06Q 10/00* (2013.01); *H04N 21/252* (2013.01); *H04N 21/25435* (2013.01); *H04N 21/25883* (2013.01)

(58) Field of Classification Search
CPC ............ H04N 21/8355; H04N 21/252; H04N 21/25435; H04N 21/25883; G06Q 10/00
(Continued)

(56) References Cited

U.S. PATENT DOCUMENTS

| 6,128,701 A | 10/2000 | Malcolm et al. |
| 6,966,006 B2 | 11/2005 | Pacheco et al. |

(Continued)

FOREIGN PATENT DOCUMENTS

| EP | 2424265 A2 | 2/2012 |
| WO | 2007/075850 A1 | 7/2007 |

OTHER PUBLICATIONS

Ryan, Malcolm Ross Kinsella: "Hierarchical Reinforcement Learning: A Hybrid Approach", A Thesis submitted as a requirement for the Degree of Doctor of Philosophy, Sep. 2002, The University of New South Wales School of Computer Science and Engineering, all pages.

(Continued)

*Primary Examiner* — Viet D Vu
(74) *Attorney, Agent, or Firm* — Thomas A. Ward

(57) ABSTRACT

The power of analytical modeling is added to existing methods for specifying policies. Generally speaking, humans use their knowledge and experience to draft policies at a relatively high level. These policies then incorporate analytical models which provide the intelligence on how to most effectively apply the high-level policy to a particular situation. When a policy is invoked, the analytical model provides up-to-date intelligence at a level of completeness and refinement not possible with previous techniques. As a result, fewer policies need to be drafted, and those few need to be updated less frequently than in previous schemes. Rather than updating the policy itself, the analytical model is automatically updated whenever new data are fed into it. As the analytical model incorporates new observational data, it grows more powerful and thus automatically increases the effectiveness of the high-level policy.

16 Claims, 4 Drawing Sheets

(51) Int. Cl.
*G06Q 10/00* (2012.01)
*H04N 21/25* (2011.01)
*H04N 21/2543* (2011.01)
*H04N 21/258* (2011.01)

(58) Field of Classification Search
USPC ....... 709/217, 219, 223, 225; 705/7.11, 7.38
See application file for complete search history.

(56) References Cited

U.S. PATENT DOCUMENTS

| | | | |
|---|---|---|---|
| 7,249,048 B1* | 7/2007 | O'Flaherty | 705/7.27 |
| 7,274,932 B1* | 9/2007 | Iyer | 455/423 |
| 7,760,643 B2 | 7/2010 | Kim | |
| 8,103,727 B2* | 1/2012 | Lin | 709/206 |
| 2006/0009991 A1 | 1/2006 | Jeng et al. | |
| 2006/0021028 A1 | 1/2006 | Brunette et al. | |
| 2007/0094265 A1 | 4/2007 | Korkus | |
| 2007/0250844 A1 | 10/2007 | Collacott | |
| 2008/0216148 A1 | 9/2008 | Bienek et al. | |
| 2008/0247314 A1 | 10/2008 | Kim et al. | |
| 2009/0049518 A1 | 2/2009 | Roman et al. | |
| 2009/0117881 A1 | 5/2009 | Deshpande | |
| 2009/0164304 A1* | 6/2009 | Otto | G06N 5/025 16/12 |
| 2009/0172779 A1 | 7/2009 | Hegde et al. | |
| 2010/0162347 A1 | 6/2010 | Barile | |
| 2010/0251327 A1 | 9/2010 | Channabasavaiah et al. | |
| 2010/0318962 A1 | 12/2010 | Jones et al. | |
| 2011/0106737 A1 | 5/2011 | Siddalingaprabhu et al. | |
| 2011/0145560 A1 | 6/2011 | Moon et al. | |
| 2012/0060198 A1 | 3/2012 | Tremblay et al. | |
| 2012/0131612 A1 | 5/2012 | Liu et al. | |
| 2012/0151527 A1 | 6/2012 | Kumar et al. | |
| 2012/0296682 A1* | 11/2012 | Kumar et al. | 705/7.11 |
| 2012/0311674 A1 | 12/2012 | Hockings et al. | |
| 2013/0110757 A1* | 5/2013 | Calippe | G06N 5/02 706/47 |

OTHER PUBLICATIONS

Lymberopoulos, Leonidas: "An Adaptive Policy Based Framework for Network Management", A thesis submitted in partial fulfillment of requirements for the Degree of Doctor of Philosophy in the faculty of Engineering of the University of London and for the Diploma of the Imperial College London, London, Oct. 2004, all pages.

Dersingh, Anand et al.:: "Context Aware Access Control Using Semantic Policies", Ubiquitous Computing and Communication Journal, (UBICC) Special Issue on Autonomic Computing Systems and Applications 3 (2008), all pages.

Strassner, John, et al. "The use of context-aware policies and ontologies to facilitate business-aware network management." Journal of Network and Systems Management 17.3 (2009): 255-284.

Langley, Pat, and Herbert A. Simon. "Applications of machine learning and rule induction." Communications of the ACM 38.11 (1995): 54-64.

Jarvis, Matthew P., Goss Nuzzo-Jones, and Neil T. Heffernan. "Applying machine learning techniques to rule generation in intelligent tutoring systems." Intelligent Tutoring Systems. Springer Berlin/Heidelberg, 2004.

Sun, Ron, Todd Peterson, and Edward Merrill. "A hybrid architecture for situated learning of reactive sequential decision making." Applied Intelligence 11.1 (1999): 109-127.

PCT Search Report & Written Opinion, Re: Application No. PCT/US13/75986; dated Oct. 23, 2014.

EPC Extended Search Report, Re: Application No. 13821272.5, dated Jun. 13, 2016.

* cited by examiner

USING ANALYTICAL MODELS TO INFORM POLICY DECISIONS

TECHNICAL FIELD

The present disclosure is related generally to computerized management systems and, more particularly, to policy-based management.

BACKGROUND

Commercial enterprises implement policies that embody decisions about how corporate assets should be managed. For example, a policy implemented by a video provider says that a particular video will be available for online rental only for the next two months. The purpose of such a policy (rather than a much simpler policy that says, for example, that all videos are available for rental at all times) is to maximize rental income while decreasing the resources that would be needed if all videos were made available at all times. (It is expected that some consumers will respond to the limited rental window by renting the video when it is available rather than waiting and running the risk that the video would not be available at a later time.)

The simplicity of the above example obscures the fact a corporation may have very many assets and that a specific policy may need to be implemented for each one. To extend the above example, while a single rental-window policy could be implemented for all videos, in reality the videos and their expected markets are all different, which means that, perhaps, each one should have a rental-window policy specific to it.

These asset-specific policies are often written by human experts who review the corporate assets and their commercial context and then craft an asset-specific policy to implement the corporation's goals. Having a policy specific to each asset can lead to increased efficiency and profits as each asset is treated in the manner most appropriate to it.

However, this specificity places a great burden on the human experts and increases the possibility of human error. To address these issues, some policies are drafted to depend upon variables that attempt to account for differences among assets and for their changing contexts, but keeping these context-aware policies up-to-date conflicts with the goal of making them as flexible as possible.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
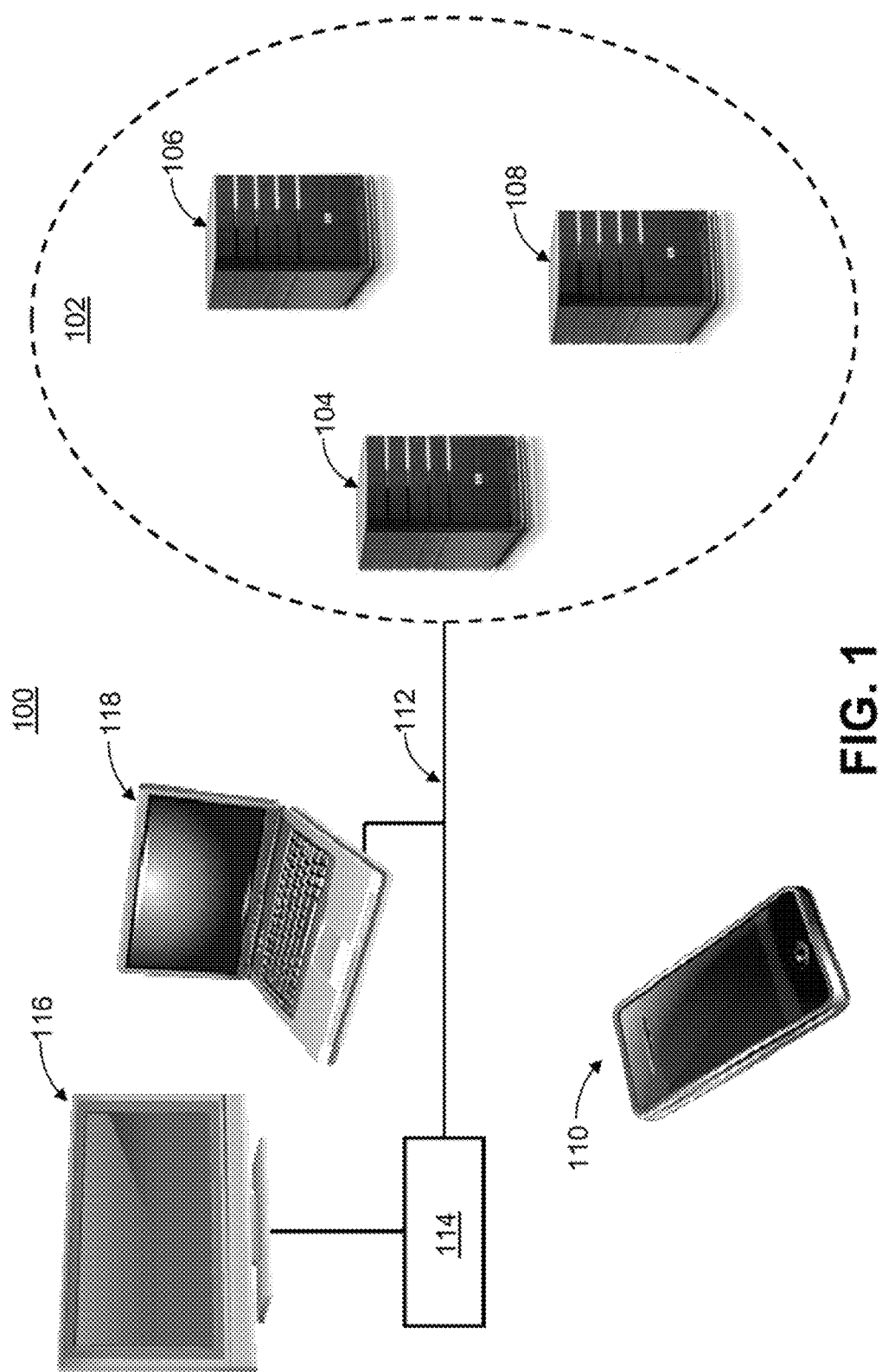
FIG. 1 is an overview of a representative environment in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The power of analytical modeling is added to existing methods for specifying policies. Generally speaking, humans use their knowledge and experience to draft policies at a relatively high level. These policies then incorporate analytical models which provide the intelligence on how to most effectively apply the high-level policy to a particular situation. When a policy is invoked, the analytical model provides up-to-date intelligence at a level of completeness and refinement not possible with previous techniques. As a result, fewer policies need to be drafted, and those few need to be updated less frequently than in previous schemes. Rather than updating the policy itself, the analytical model is automatically updated whenever new data are fed into it. As the analytical model incorporates new observational data, it grows more powerful and thus automatically increases the effectiveness of the high-level policy.

To understand these concepts more fully, first consider the representative communications environment 100 of FIG. 1. Connected together via any or all of various known networking technologies 102 are media-content servers 104 (e.g., television-programming servers, web servers, and the like), a policy server (or "policy engine") 106, and an administrative server 108. (The functions of these servers 104, 106, 108 are discussed below.) Some of the media-content servers 104 may head-end a cable-television delivery system 112. For ease of illustration, only three servers 104, 106, 108 are shown, but numerous servers 104, 106, 108 can exist and can work together, as discussed below.

In an actual implementation of the communications environment 100, the functions of the servers 104, 106, 108 may all reside on one computing platform, may be hosted separately on separate servers (as depicted in FIG. 1), or may each be spread out among several computing platforms. Indeed, at least some aspects of these functions may be embodied on any number of computing devices including the set-top box 114, a personal communications device, the television 116, the mobile telephone 110, a personal digital assistant, the personal computer 118, a tablet computer, a gaming console, a media-restreaming device, and a plurality of servers. Also according to aspects of the present disclosure, when a policy runs on the policy server 106, it may invoke an analytical model which may be instantiated and run on the same policy server 106 or elsewhere. Rather than mentioning these implementation possibilities again, the present discussion refers to these functions as if they were hosted on disparate servers 104, 106, 108, as shown in FIG. 1.

Head-end servers 104 provide, via the networking technologies 102, media-download and television services to end-user devices. Non-wireless end-user devices are supported by "wireline" network technologies (e.g., fiber, wire, and cable) 112. For example, a set-top box 114 generally receives television programming from a head-end server 104 and provides a user interface (e.g., an interactive program guide) for selecting and viewing content from the head-end server 104. A digital video recorder (not shown) can store programming for later viewing. The video content may be viewed on a television monitor 116. In some situations, a laptop computer 118 accesses web-based services either wirelessly or via the wireline network 112. A gaming console, home gateway, kiosk, digital sign, or media-restreaming device (not shown) are other possible end-user devices.

Options for connecting these devices and services are well known in the art and need not be further discussed.

(A media-restreaming device transfers content between disparate types of networks. For example, it receives content from the cable system 112 and then transmits that content over a local radio link such as WiFi to a smartphone 110. The media-restreaming device usually operates in both directions to carry messages between the networks. In some embodiments, aspects of the present invention are practiced by a media-restreaming device.)

Television programming (and other media content) can also be delivered to non-traditional subscriber devices such as the smartphone 110. This smartphone 110 communicates wirelessly to a wireless base station (not shown but known in the art) to access the public switched telephone network, the Internet, or other networks to access web-based services as well as the television-delivery services provided by the media-content providers 104.

Wireless and wireline network technologies generally support two-way traffic: Media content and related information are delivered to the end-user devices 110, 114, 116, 118, and requests and other information go "up" to the servers 104, 106, 108.

It is well known that entities providing media content may implement policies about how and when that content is made available. One policy may, for example, set one price to download a movie in standard definition and set another price for downloading a high-definition version of the same movie. Another policy may set a price discount for premium subscribers. Yet another policy may state that a media content item will only be available for viewing during the next week. Many other types of policies are known in the art and each type may, or may not, be appropriately applied to each media content item or to each family of content items. In the representative environment 100 of FIG. 1, these policies are hosted by the policy server 106. When policies are implemented, they may affect the operations of the media-content server 104 which may, for example, update an interactive program guide to reflect the policies currently in effect.

New policies may be composed on the administrative server 108 prior to moving them to the policy server 106 for live implementation.

Figure 2:
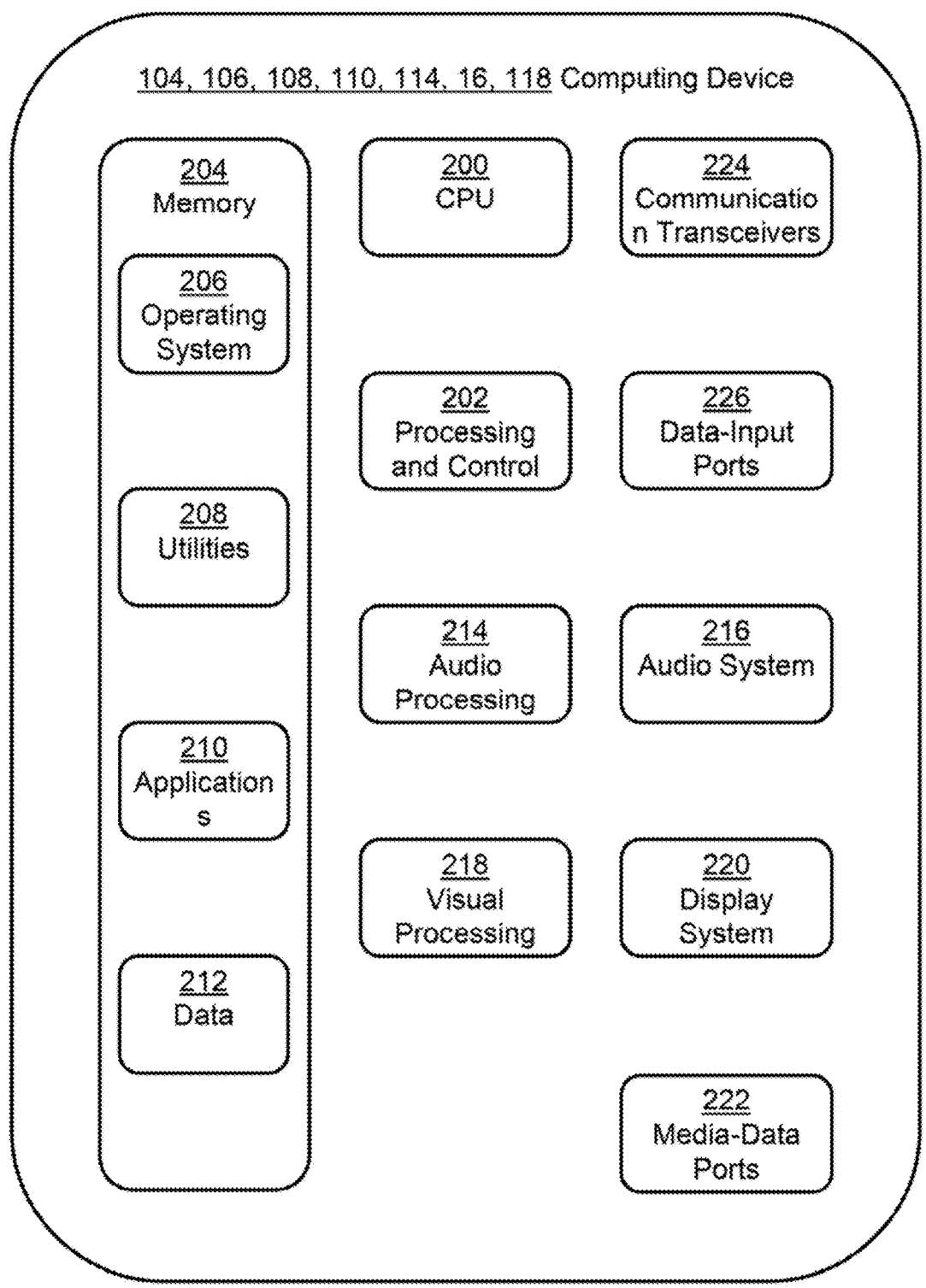
FIG. 2 is a generalized schematic of some of the devices shown in FIG. 1.

FIG. 2 shows the major components of a representative media-content server 104, policy server 106, administrative server 108, or end-user device 110, 114, 116, 118. The computing device of FIG. 2 could even be a plurality of servers working together in a coordinated fashion.

Figure 3:
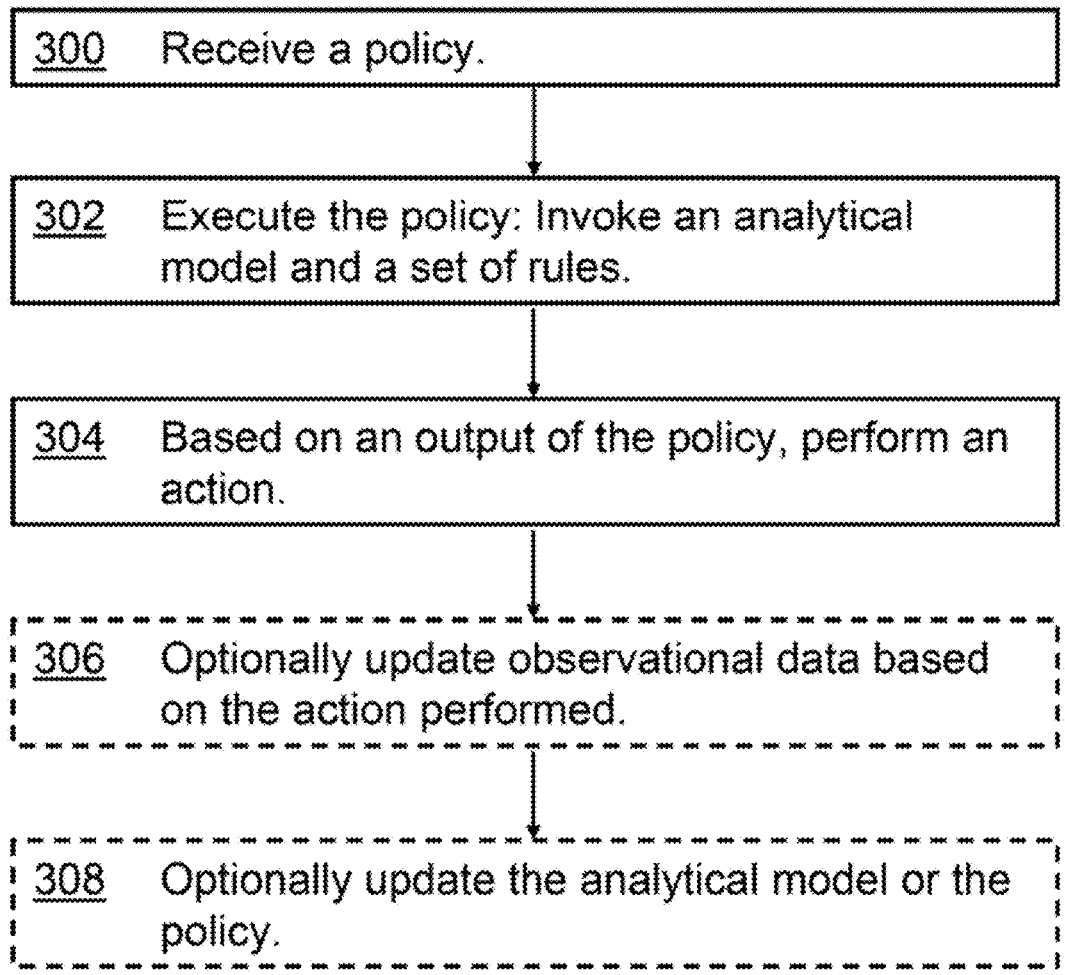
FIG. 3 is a flowchart of a representational method for invoking a policy based on an analytical model.
Figure 4:
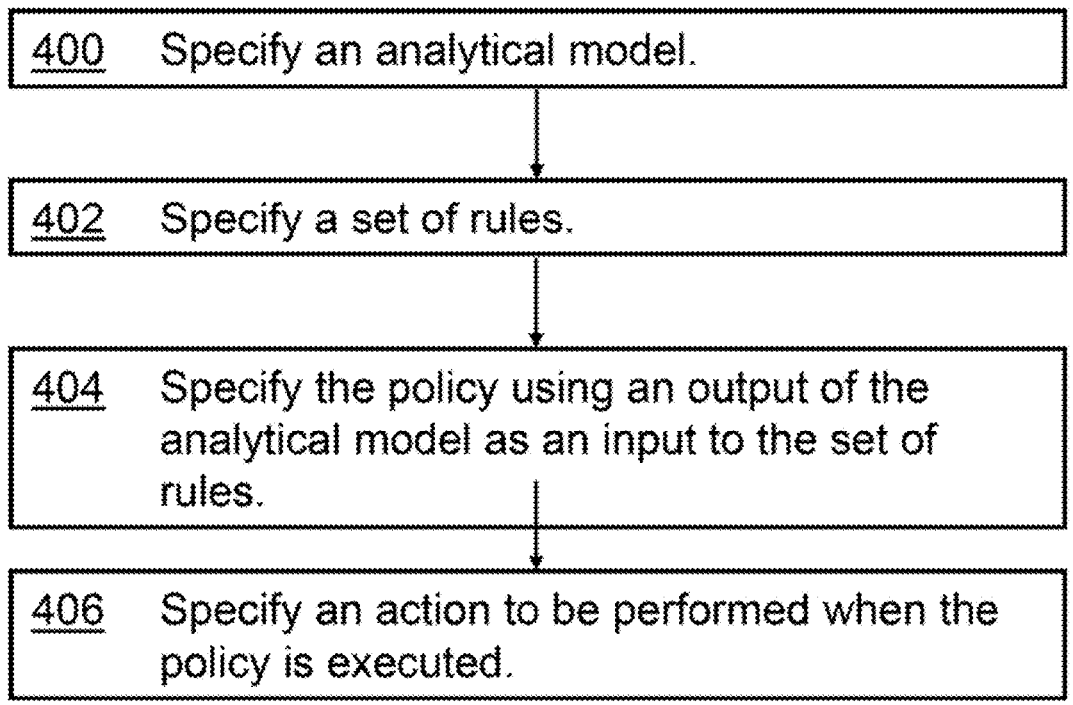
FIG. 4 is a flowchart of a representational method for creating a policy based on an analytical model.

The CPU 200 of the computing device includes one or more processors (i.e., any of microprocessors, controllers, and the like) or a processor and memory system which processes computer-executable instructions to control the operation of the device. In particular, the CPU 200 supports aspects of the present invention as illustrated in FIGS. 3 and 4, discussed below. The device can be implemented with a combination of software, hardware, firmware, and fixed-logic circuitry implemented in connection with processing and control circuits, generally identified at 202. Although not shown, the device can include a system bus or data transfer system that couples the various components within the device. A system bus can include any combination of different bus structures, such as a memory bus or memory controller, a peripheral bus, a universal serial bus, and a processor or local bus that utilizes any of a variety of bus architectures.

The computing device also includes one or more memory devices 204 that enable data storage, examples of which include random-access memory, non-volatile memory (e.g., read-only memory, flash memory, EPROM, and EEPROM), and a disk storage device. A disk storage device may be implemented as any type of magnetic or optical storage device, such as a hard disk drive, a recordable or rewriteable disc, any type of a digital versatile disc, and the like. The device may also include a mass-storage media device.

The memory system 204 provides data-storage mechanisms to store device data 212, other types of information and data, and various device applications 210. An operating system 206 can be maintained as software instructions within the memory 204 and executed by the CPU 200. The device applications 210 may also include a device manager, such as any form of a control application or software application. The utilities 208 may include a signal-processing and control module, code that is native to a particular component of the computing device, a hardware-abstraction layer for a particular component, and so on.

The computing device can also include an audio-processing system 214 that processes audio data and controls an audio system 216 (which may include, for example, speakers). A visual-processing system 218 processes graphics commands and visual data and controls a display system 220 that can include, for example, a display screen. The audio system 216 and the display system 220 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 222. In some implementations (e.g., the set-top box 114 which drives the television monitor 16), the audio system 216 and the display system 220 are components external to the device. Alternatively (e.g., in the cellular telephone 110), these systems 216, 220 are integrated components of the device.

The computing device can include a communications interface which includes communication transceivers 224 that enable wired or wireless communication. Example transceivers 224 include Wireless Personal Area Network radios compliant with various IEEE 802.15 standards, Wireless Local Area Network radios compliant with any of the various IEEE 802.11 standards, Wireless Wide Area Network cellular radios compliant with 3GPP standards, Wireless Metropolitan Area Network radios compliant with various IEEE 802.16 standards, and wired Local Area Network Ethernet transceivers.

The computing device may also include one or more data-input ports 226 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 226 may include USB ports, coaxial-cable ports, and other serial or parallel connectors (including internal connectors) for flash memory, storage disks, and the like. These data-input ports 226 may be used to couple the device to components, peripherals, or accessories such as microphones and cameras.

The flowchart of FIG. 3 shows how the policy server 106 implements a policy. (Recall that, as discussed above, the "policy server" is actually a function that can be hosted on any number of devices. For clarity's sake, the present discussion assumes that the method of FIG. 3 is performed by a single, discrete device 106.)

In step 300, the policy server 106 receives a policy. The policy server 106 may store numerous policies that are retrieved when circumstances dictate. For example, a given policy can be automatically invoked based on particular timing information (e.g., once per day) or when specific media-content items are requested by end-users. Other policies may invoked for special situations, e.g., for the duration of a live football game or during a holiday. Many options for invoking policies are known in the art and need not be elaborated on further.

In step 302, the policy is executed. Policies are traditionally stated in terms of rules. In this particular case, the statement of the policy calls for the invocation of an analytical model in addition to the rules. The model invocation may be specified by a rule. (In a simple case, a policy may be written as a single rule that invokes the analytical model.)

Many possibilities are envisaged for the interaction of the analytical model and the policy. If the analytical model is crafted as a first-class entity, then known techniques for using first-class entities can be applied. Some policies are written using the known triplet of event, action, rule. Here, one or more analytical models may serve to inform any or all of the elements of the triplet.

In some situations, invoking the policy may call for the analytical model to be instantiated. In other cases, the invoking may causes the analytical model to update itself by collecting or processing recent observations. Generally speaking, invoking the analytical model calls for an analysis based on the data available to the analytical model at the time of its invocation. Thus, identical invocations, separated in time, can return different results, as the underlying analytical model changes. This illustrates an advantage of using analytical models within the policy framework: The policies themselves need not be directly changed, but they are kept up-to-date by the continuing work of the analytical models.

Different types of analytical models are contemplated. Some models focus on specific entities, such as an individual consumer of media content, the class of potential consumers, or a sub-group of consumers somehow linked together, e.g., those within a social network or those sharing some definable characteristic. Preference statements and behavioral observations can be collected and associated with the specific entity, and the model can thereby learn the habits of the entity. For example, it may be observed that a particular group of consumers are much less likely to pay to view a recorded sporting event a week or more after the event takes place. The overlying policy can use that observation in setting a price vs. viewing time curve to garner the highest revenue.

Generally speaking, an output determined by the analytical model can serve as an input to a rule of the policy.

In step 304, the policy determines that some action be performed. Policy-based actions are well known. For example, a price for downloading a particular media content item can be set, a message or recommendation can be sent to a specific audience, or information may be gathered to inform future policy decisions.

In addition, optional step 306 considers the fact that the action performed in step 304 may become an observational datapoint considered by future invocations of the analytical model.

Finally, in optional step 308, the invocation of the policy may cause either the analytical model or the specifics of the policy itself to be updated.

FIG. 4 presents a method for composing a policy that relies upon an analytical model. In step 400, at least one analytical model is specified. The model may be created for this use, or may be an already existing model, possibly provided by a commercial entity distinct from the entity that runs the policy. For example, one company may collect demographic information, feed it into an analytical model, and then sell outputs of that model to other companies, such as a media provider that is interested in the demographics of a set of targeted consumers.

In step 402, rules are developed. Many rules have traditionally been developed by human beings, and they may be very complicated. In some situations, rules embody specific aspects of a commercial entity's business model.

The rules and analytical model are joined together in step 404 to create a policy. In a commercial setting, the policy joins, and possibly trades off among, different aspects of a business model to form a coherent whole. The analytical model provides up-to-date information and analysis to inform the implementation of the policy.

The output of the policy is specified in step 406. As discussed above, many types of policy-based actions are known and need not be discussed further.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for a policy engine running on a computing device to perform an action, the method comprising:
   receiving, by the policy engine, a policy;
   executing, by the policy engine, the policy, wherein executing the policy comprises invoking an analytical model and invoking a set of rules, the set of rules distinct from the analytical model, wherein the analytical model is updated by collecting and processing recent innovations affecting changes to the policy without the policy being directly changed; and
   based, at least in part, on executing the policy, performing, by the policy engine, an action.

2. The method of claim 1 wherein the policy comprises timing information for executing the policy.

3. The method of claim 1 wherein the analytical model is based, at least in part, on observational data.

4. The method of claim 3 wherein the observational data comprise behavioral data associated with an entity.

5. The method of claim 4 wherein the entity is selected from the group consisting of: a person, a plurality of persons, a corporate entity, a social network of persons, a group of persons defined by a shared contextual attribute, and an entity defined by a collection rule.

6. The method of claim 4 wherein the behavioral data comprise an element selected from the group consisting of: a preference explicitly stated by the entity, a preference explicitly stated by something other than the entity, passive usage data, passive contextual data, and a statistical aggregation of behavioral data.

7. The method of claim 3 further comprising: updating the observational data to reflect the performance of the action.

8. The method of claim 1 wherein the set of rules consists of a single rule.

9. The method of claim 1 wherein an output of the analytical model is an input to a rule in the set of rules.

10. The method of claim 1 wherein the analytical model is a part of an element of the policy selected from the group consisting of: an event specification, an action specification, and a rule specification.

11. The method of claim 1 wherein the action is selected from the group consisting of: providing a recommendation, choosing a message to send, providing a prediction, and mapping a behavioral pattern.

12. The method of claim 1 wherein the action comprises altering the policy.

13. A computing device configured for running a policy engine, the computing device comprising:
   a communications interface; and
   a processor operatively connected to the communications interface and configured for:
      receiving a policy;
      executing, by the policy engine, the policy, wherein executing the policy comprises invoking an analytical model and invoking a set of rules, the set of rules distinct from the analytical model, wherein the analytical model is updated by collecting and processing recent innovations without the policy being directly changed; and
      based, at least in part, on executing the policy, performing an action.

14. The computing device of claim 13 wherein the computing device is selected from the group consisting of: a personal electronics device, a mobile telephone, a personal digital assistant, a tablet computer, a compute server, and a coordinated group of compute servers.

15. The method of claim 1, wherein after the policy is executed, the policy is updated based on updates to the analytical model.

16. The computing device of claim 13, wherein after the policy is executed, the policy is updated based on updates to the analytical model.

* * * * *